United States Patent [19]
Kimmelaar

[11] 3,866,489
[45] Feb. 18, 1975

[54] DYNAMIC BALANCING APPARATUS
[75] Inventor: Rudolf Johan Kimmelaar, Vlaardingen, Netherlands
[73] Assignee: Cincinnati Milacron Inc., Cincinnati, Ohio
[22] Filed: Nov. 16, 1973
[21] Appl. No.: 416,689

[52] U.S. Cl. .................. 74/573, 51/169, 73/468
[51] Int. Cl. ............................. B24b 41/04
[58] Field of Search .......... 74/573; 51/169; 73/458, 73/468, 469, 470

[56] References Cited
UNITED STATES PATENTS

| 1,730,019 | 10/1929 | Trumpler | 73/469 |
|---|---|---|---|
| 3,218,884 | 11/1965 | Backer et al | 74/573 |
| 3,698,263 | 10/1972 | Ito | 74/573 |
| 3,702,082 | 11/1972 | Decker | 51/169 X |

FOREIGN PATENTS OR APPLICATIONS
1,203,244  8/1970  Great Britain ................ 74/573

Primary Examiner—Samuel Scott
Assistant Examiner—F. D. Shoemaker

[57] ABSTRACT

A device for balancing rotating bodies such as grinding wheels, by causing the center of gravity of a counterweight to move along a predetermined path relative to the body while the latter is rotating. The path followed by the center of gravity of the counterweight is such that it is caused to continually and repeatedly increase and decrease its radial distance from the axis of rotation as it progresses angularly around the axis. Preferably, provision is made for reversing its direction of movement along the path so that balance may be approached by the shortest route.

5 Claims, 12 Drawing Figures

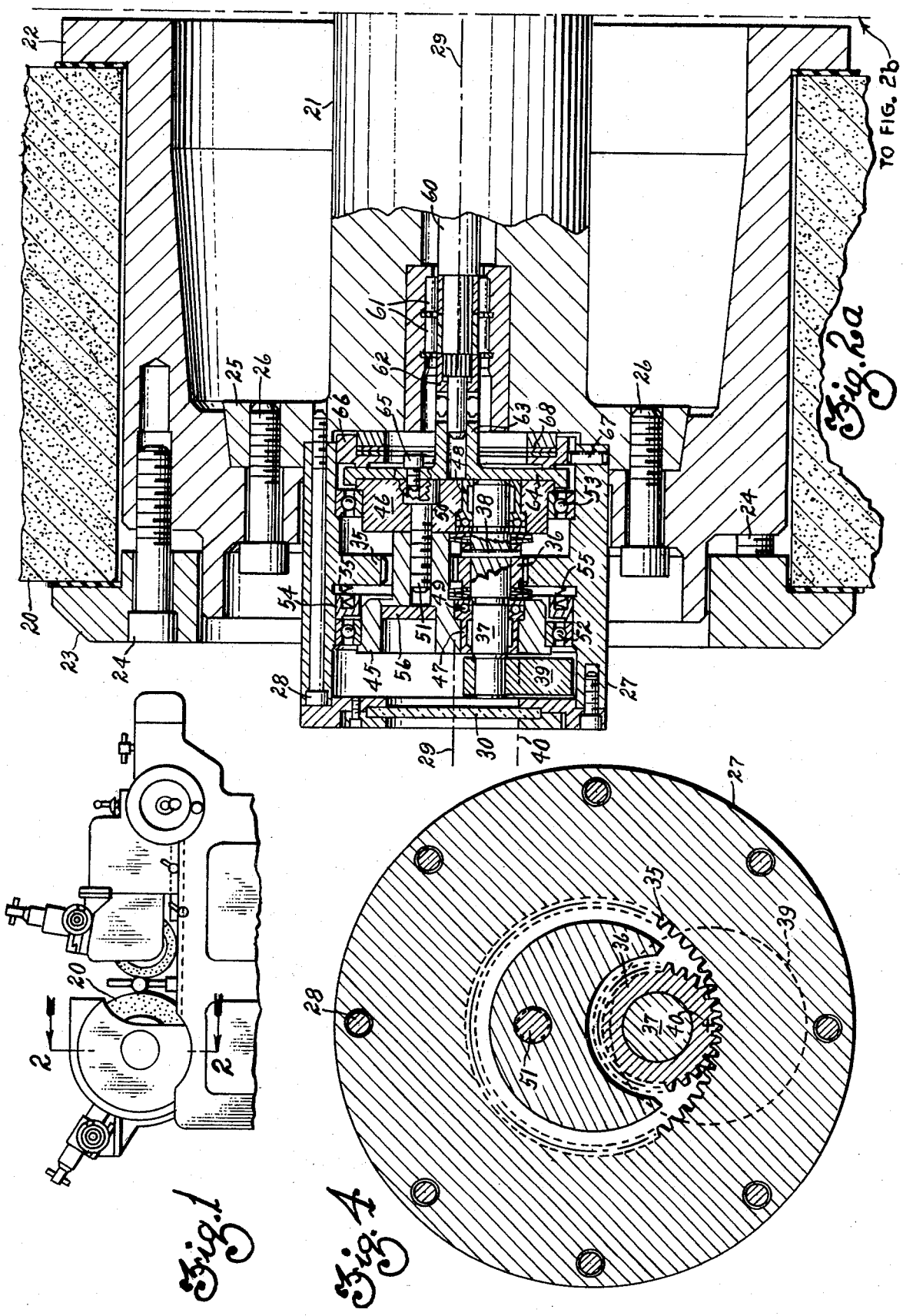

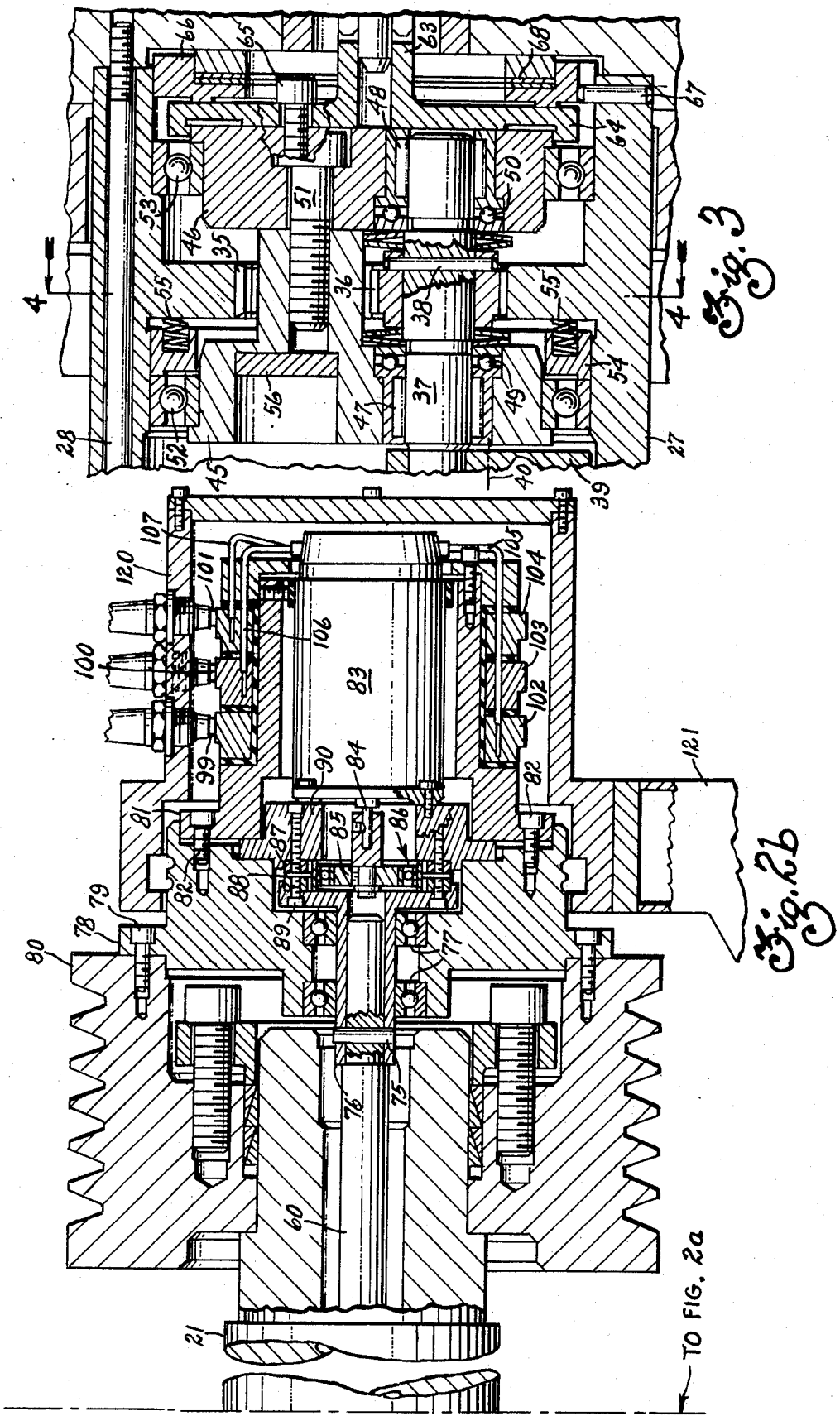

DYNAMIC BALANCING APPARATUS

BACKGROUND OF THE INVENTION

This invention relates to the balancing of rotating bodies and particularly to the balancing of rotating members such as grinding wheels which may require rebalancing periodically during use. Where frequent rebalancing is required, it is desirable to provide a balancing device which is a permanent part of the set-up and which may be operated to rebalance a wheel without removing it from the machine. Most of the prior art devices are based on the principal of a two-step adjustment in which either one or two weights are first rotated about the axis to correct the phasing. After a point of minimum vibration is reached if two weights are used, they are fanned apart to correct the magnitude of the compensation. If a single weight is used, its radial position is adjusted as necessary to eliminate the vibrations remaining after the phasing step. This approach requires two drive mechanisms, one for phasing adjustment and one for magnitude adjustment. Some of the devices use a single drive source with two clutches for selecting either the phasing or the magnitude adjustment.

SUMMARY OF THE INVENTION

The apparatus forming the subject invention is based on a totally different concept than the previous balancing devices. In the new approach, use is made of a hypocycloidal generator for causing a single counterweight to scan back and forth across the rotational axis while at the same time progressing angularly around that axis so as to cover practically all combinations of radial and angular locations in a plane lying normal to the axis. In the application of the invention to a grinding machine, a weight in the spindle nose is moved along a predetermined path whereby its phase and magnitude are continuously adjusted at the same time until a point of balance is reached. The new device requires only a single drive mechanism which preferably is capable of reversal so that the shortest route to balance may be chosen.

A preferred embodiment of the invention will hereinafter be described in conjunction with accompanying drawings in which:

FIG. 1 is a side elevation of a typical grinding machine to which a balancing device of the type hereinafter to be described may be applied.

FIGS. 2a and 2b together comprise a cross-sectional view taken along the line 2—2 in FIG. 1.

FIG. 3 is an enlarged view of a portion of the mechanism shown in FIG. 2a.

FIG. 4 is a cross-sectional view taken along the line 4—4 in FIG. 3.

Figure 5:
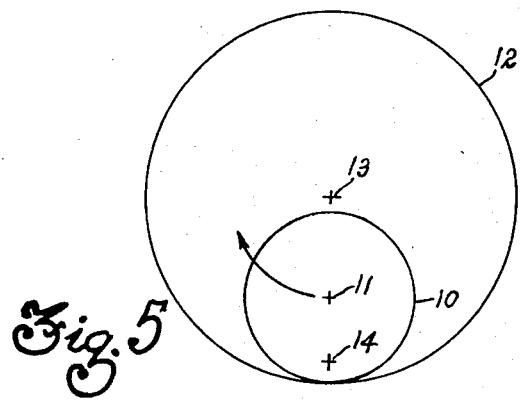
FIGS. 5–10 are diagramatic views illustrating the principal of operation of the new balancing device.
Figure 6:
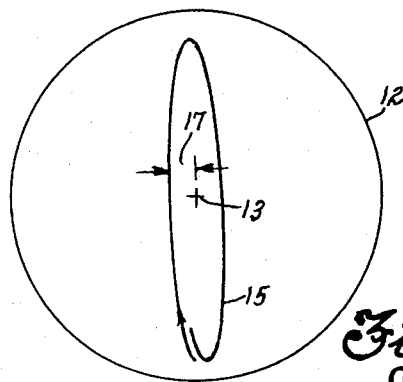
Figure 7:
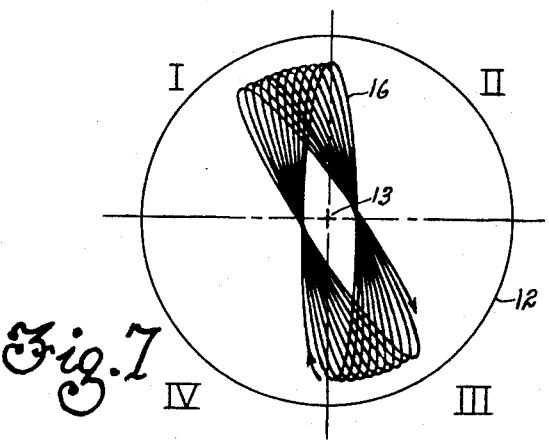
Figure 8:
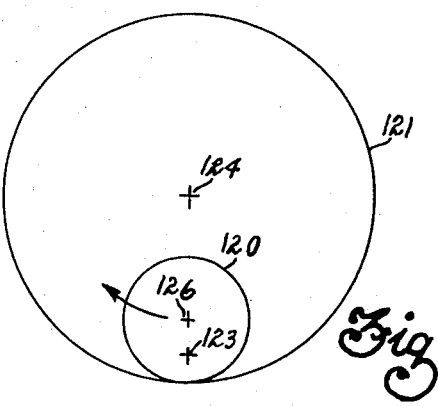

The principal on which the new balancing device is based may best be understood by referring to FIGS. 5–10 of the drawings. In these figures, two different hypocycloidal paths are illustrated. FIGS. 5–7 relate to a 2-lobed path, or track, designed to be followed by the center of gravity of the counterweight, while FIGS. 8–10 concern a 3-lobed path. In either case the path, or track, is generated by a point lying on the circumference or along a radius of a smaller circle rolling inside a larger circle. In the present specification, the path thus generated is denominated as a hypocycloidal path. In FIG. 5, the smaller circle 10 rotates freely about its center 11 as it rolls around a larger circle 12. The center 13 of the larger circle represents the center of rotation of the body to be balanced. The smaller circle 10 may, for example, represent the pitch diameter of a spur gear meshing with an internal gear whose pitch diameter is represented by the larger circle 12. The spur gear may have affixed thereto a counterweight having a center of gravity 14 lying on a radius of the small circle. In the example shown in FIGS. 5–7, the gear 10 is provided with 52 teeth and the gear 12 is provided with 105 teeth. As the gear 10 rolls around the internal gear 12 the center of gravity 14 will describe a path or track 15 as shown in FIG. 6. For one revolution of the axis 11 about the center 13, the gear 10 will make two revolutions plus one tooth. Thus, after 10 revolutions of the axis 11 about the center 13 in a clockwise direction, the center of gravity will trace the hypocycloidal path 16 shown in FIG. 7.

It will be seen from FIG. 7, that quadrants I and III are reached when the axis 11 moves clockwise. If the rotation is reversed, quadrants II and IV will be reached. After 52 revolutions of axis 11 around the center 13, the pattern will be repeated. Consequently, 26 revolutions of axis 11 clockwise or counterclockwise from any particular position will be sufficient to completely scan the circle and to reach any setting of center of gravity 14 required in order to compensate for any unbalance of the grinding wheel or other rotating body. The maximum balancing inaccuracy will be equal to one-half the distance between adjacent excursions of the path and may be made small enough to be acceptable for most grinding operations. The minimum inaccuracy which cannot be compensated by the system is represented by the radial distance 17 (FIG. 6) and this again may be made sufficiently small to be acceptable in most applications of the device.

Referring now to the physical embodiment of the invention, FIG. 1 shows a grinding machine of well-known type to which the new balancing device may be applied. It is to be appreciated, however, that application of the device is not limited to this particular type of machine. The grinding machine shown in FIG. 1 is provided with a grinding wheel 20 which is mounted on a spindle 21 (FIG. 2a) by means of flanges 22 and 23 which are drawn together by bolts 24. The flange 22 is secured to a flange 25 on the spindle 21 by bolts 26.

The balancing device is contained in a cylindrical casing 27 fastened by screws 28 to the end of the spindle with the axis of the casing coinciding with the axis 29 of the spindle. The outer end of the casing is enclosed by a transparent cover plate 30. Formed in the center of the casing is an internal gear 35 (FIG. 3) which corresponds functionally to the gear 12 (FIG. 5), but which, in the preferred embodiment of the invention shown in FIGS. 1–4, is provided with 65 teeth. Meshing with the gear 35 is a pinion gear 36 fastened to a shaft 37 by a pin 38. The pinion gear 36 which corresponds in function to the spur gear 10 earlier described, may in this case be provided with 32 teeth so as to provide a one-tooth offset of the track on each revolution of the shaft 37 as earlier explained. However, the numbers of teeth on gears 35 and 36 is not critical and may be varied to suit the requirements of the particular application involved. A disc-shaped counterweight 39 (FIGS. 2a and 4) is secured to the shaft 37 so as to rotate therewith and cause the center of gravity 40 thereof to follow a hypocycloidal path as the pinion 36 rolls around internal gear 35.

Shaft 37 is journaled in a pair of circular carriers 45 and 46 by radial bearings 47 and 48 and thrust bearings 49 and 50. The carriers are fastened together by a screw 51 and are journaled for rotation as a unit within the casing 27 by ball bearings 52 and 53. Bearing 52 is preloaded by a ring 54 and springs 55 which apply endwise pressure to the outer race of the bearing. Hence, as the carrier assembly is rotated, the pinion 36 will roll around the gear 35 and cause the center of gravity 40 of the counterweight 39 to follow the desired hypocycloidal path or track. A counterbalance weight 56 secured to carrier disc 45 is provided to balance the off-center weight of the gear and shaft assembly 36 and 37.

Carrier rotation is effected by a drive shaft 60 extending through the center of the spindle 21 and journaled therein by bearings 61 (FIG. 2a). A coupling half 62 is splined to the left-hand end of the shaft and engages a second coupling half 63 having a face plate 64 secured to the carrier 46 by screws 65. A brake disc 66 bearing against the inner surface of the body 27 is held against rotation by pin 67 and is pressed against face plate 64 by spring washers 68. The resulting friction brake serves to prevent inadvertent rotation of the shaft 37 and counterweight 39 relative to the spindle after balancing has been effected.

At the pulley end of the spindle, the drive shaft 60 is connected by a pin 75 (FIG. 2b) to a coupling 76 which is journaled by bearings 77 in a bracket 78. This bracket is secured by screws 79 to a drive pulley 80 mounted on the end of the spindle 21 opposite the grinding wheel. A motor housing 81 rotating with the spindle is fastened to bracket 78 by the screws 82 and contains an electric motor 83 mounted on a support ring 90 clamped between the housing 81 and the bracket 78. The drive shaft 84 of the motor is connected to the wave generator 85 of a harmonic differential drive mechanism 86 having a stationary spline 87 and an output spline 88 which is fastened to the coupling 76 by screws 89. Hence, a large reduction in speed, for example 160:1, is effected between the motor shaft 84 and drive shaft 60 and a sufficiently large torque is applied by the motor to the drive shaft to overcome the friction of the brake disc 66 (FIG. 2a) and cause rotation of the carrier assembly.

Figure 11:
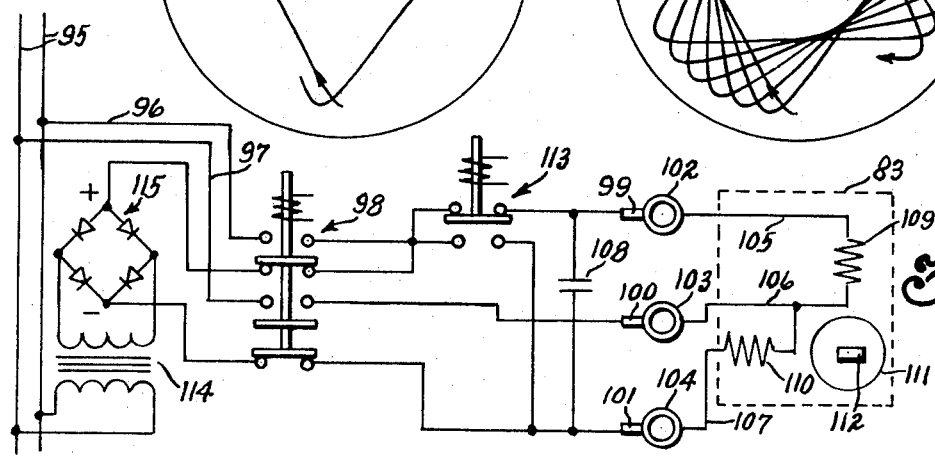
FIG. 11 is a wiring diagram for the reversable electric motor which drives the counterweight in one direction or the other along the aforementioned hypocycloidal path.

The motor 83 is synchronous type having a stator winding with four-pole pairs and a rotor having four-pole pairs of permanent magnets. One possible form of wiring diagram for the motor is shown in FIG. 11. As herein shown, a 110 volt ac supply line 95 is connected by leads 96 and 97 to the contacts of a normally deenergized relay 98. When the relay is energized, ac potential is supplied to brushes 99 and 100 which contact collector rings 102 and 103 to which stator wires 105 and 106 are connected. A third brush 101 contacting collector ring 104 connected to stator wire 107 is fed from lead 96 through a capacitor 108. Thereby, ac current will be supplied to stator coils 109 and 110 of the motor in the appropriate phase relationship to cause counterclockwise rotation of the armature 111 carrying bar magnet 112. When a reversing relay 113 is energized, the lead 96 will be connected to brush 101 and brush 99 will be fed from lead 96 through capacitor 108. This will reverse the field of the motor and the armature will rotate in a clockwise direction. When both relays are deenergized, as shown in FIG. 11, a source of dc current provided by a step-down transformer 114 and rectifier 115 will be supplied to brushes 99 and 101 so as to supply the stator coils 109 and 110 with approximately 35 volts dc. This will brake the armature and prevent unwanted rotation of the counterweight 39 so long as the relays remain deenergized and power is supplied to the line 95. However, when relay 98 is energized with or without energization of reversing relay 113, the dc braking current will be removed from the stator coils and ac current will be supplied thereto to drive the motor in the desired direction. Suitable push buttons may be provided for operating relays 98 and 113.

As shown in FIG. 2b, the brushes 99, 100 and 101 are mounted in a stationary housing 120 connected to a bracket 121 bolted to the frame of the grinding machine. The collector rings 102, 103 and 104 are carried by the motor housing 81 and are suitably insulated from one another and from the housing. Leads 105, 106 and 107 extend from the collector rings to the interior of the motor 83 where they are connected to the stator coils as indicated in the wiring diagram.

Figure 9:
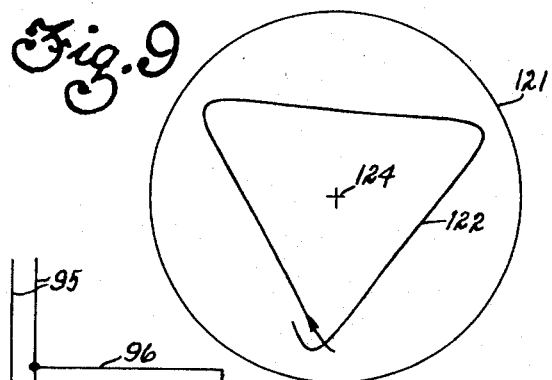
Figure 10:
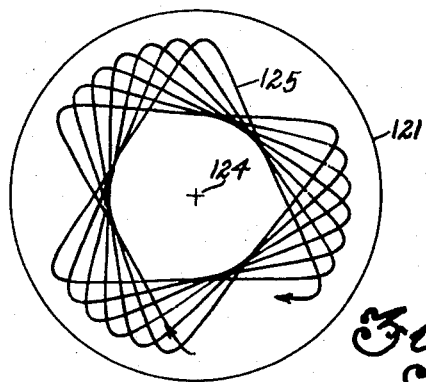

In the modified form of hypocycloidal path followed by the center of gravity of the counterweight, a small circle 120 (FIG. 8) rolls inside a larger circle 121 and produces a three-cornered path 122 (FIG. 9). To provide an angular progression of the path traced by the center of gravity 123 around the center 124 of the larger circle, the number of teeth on the internal gear representing this latter circle must be equal to three times the number of teeth on the pinion representing the small circle plus or minus one or more teeth. In the example shown in FIGS. 8–10, the path or track 125 (FIG. 10) was generated by large and small gears having 105 and 36 teeth respectively. With this arrangement, the pattern will repeat itself every 120° of the larger circle or after every 12 revolutions of the center 126 of the smaller circle. Hence, six revolutions of the center 126 clockwise or counterclockwise from any given starting position will be sufficient to bring the center of gravity 123 to a position of balance since a complete scan of the circle can be achieved in 12 revolutions.

While in the foregoing specification certain specific embodiments of the invention have been described for purposes of illustration, it will be understood that the details of the specification may be varied without departing from the scope of the invention as defined by the claims which follow.

What is claimed is:

1. A balancing apparatus for a body rotating about a predetermined axis comprising a spindle for supporting said body for rotation about said axis, a casing mounted on said spindle adjacent said body, an internal gear disposed in said casing in fixed, coaxial relationship with said spindle, a carrier journaled in said casing for rotation about the axis of said spindle, a pinion gear journaled in said carrier and meshing with said internal gear, a balancing mass attached to said pinion gear with its center of gravity eccentric to the axis thereof, and selectively operable means for rotating said carrier relative to said spindle thereby causing the center of gravity of said mass to describe a hypocycloidal path in a plane normal to the axis of said spindle.

2. The balancing apparatus of claim 1 wherein said spindle is hollow and receives a rotary drive shaft coaxially disposed therein for rotating said carrier.

3. The balancing apparatus of claim 1 including a reversible electric motor coaxially supported on said spindle for operating said drive shaft in one direction or the other relative to said spindle as the latter is rotating.

4. The balancing apparatus of claim 3 including means for applying a braking potential to said motor whenever the driving potential is removed therefrom.

5. The balancing apparatus of claim 1 including brake means for continuously and yieldable restraining rotation of said carrier relative to said spindle.

* * * * *